No. 662,780. Patented Nov. 27, 1900.
V. L. & W. R. EMERSON.
PROCESS OF OBTAINING CALCIUM ACETATE.
(Application filed Nov. 9, 1899.)
(No Model.)
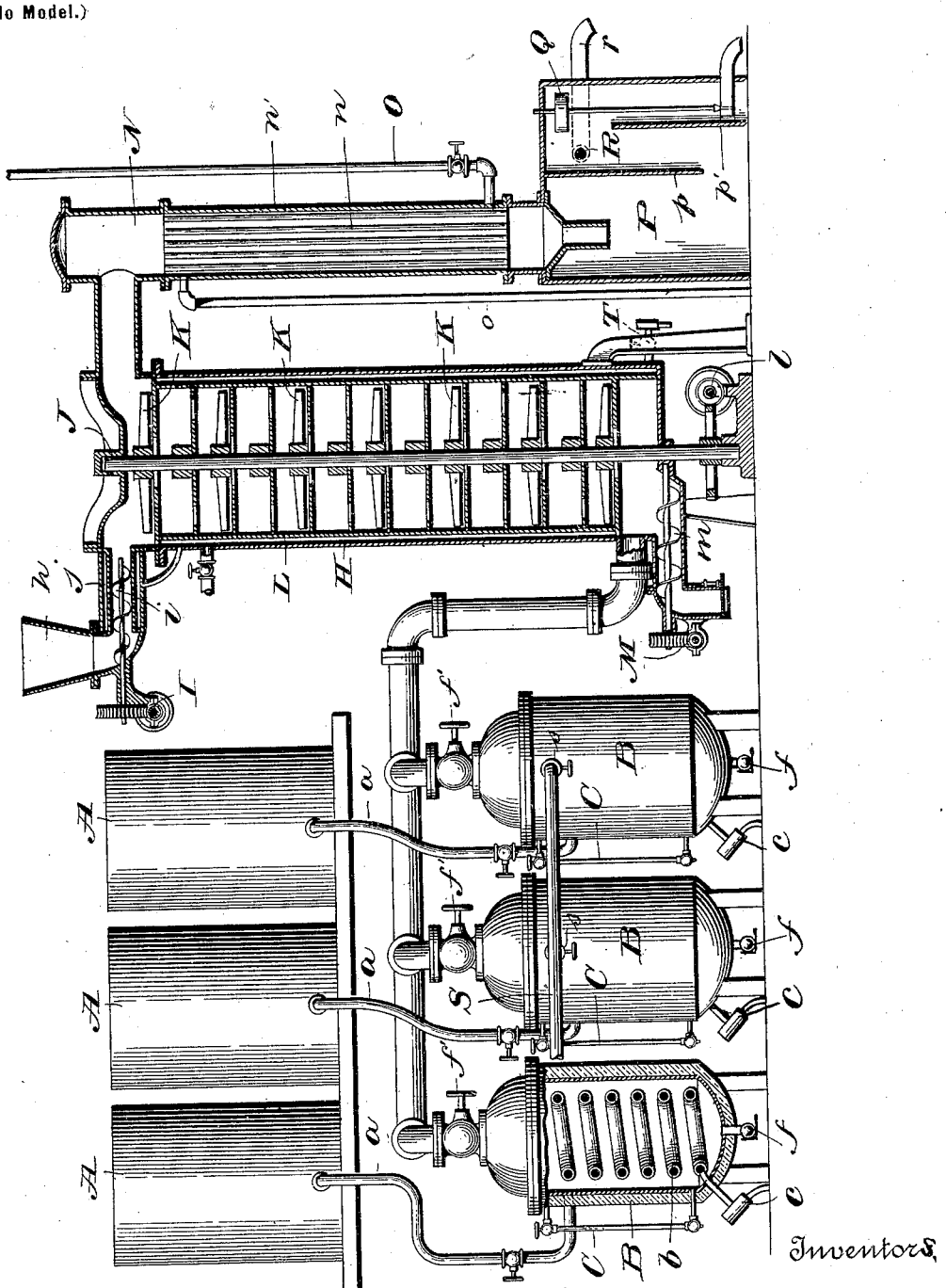
Witnesses
L. C. Hills.
R. L. Williams.
Inventors,
Victor Lee Emerson,
William R. Emerson,
By Franklin H. Hough
Attorney

UNITED STATES PATENT OFFICE.

VICTOR LEE EMERSON, OF BALTIMORE, MARYLAND, AND WILLIAM R. EMERSON, OF WASHINGTON, DISTRICT OF COLUMBIA.

PROCESS OF OBTAINING CALCIUM ACETATE.

SPECIFICATION forming part of Letters Patent No. 662,780, dated November 27, 1900.

Application filed November 9, 1899. Serial No. 736,387. (No specimens.)

*To all whom it may concern:*

Be it known that we, VICTOR LEE EMERSON, residing at Baltimore, in the State of Maryland, and WILLIAM R. EMERSON, residing at Washington, in the District of Columbia, citizens of the United States, have invented certain new and useful Improvements in Processes for Recovering Acetic Acid and Forming Calcium Acetate and other Acetates; and we do declare the following to be a full, clear, and exact description of the invention, such as will enable others skilled in the art to which it appertains to make and use the same, reference being had to the accompanying drawing, and to the letters of reference marked thereon, which forms a part of this specification.

The object of our invention is to form calcium acetates or other acetates in a great state of purity from crude pyroligneous acid and separate the tarry matter and recover the products that vaporize below and above the boiling-point of acetic acid at one operation.

A further object is to make the process continuous and save several steps as heretofore practiced in the recovery of acetic acid and the formation of calcium acetates or other acetates.

Our process is especially adapted to treating distillate of wood, known as "pyroligneous acid," but may be used for treating other crude acids to form the several acetates.

Commercial acetate of calcium is at the present time produced largely from the acid distillate of hard wood, which contains acetic acid, alcohol, tarry matter, and foreign acids, which are separated and refined by the recognized method as follows: The crude acetic acid after being once distilled to separate the greater portions of tarry matter is neutralized with lime, then the whole mixture evaporated until a salt is formed, and the salt is then removed to a roasting-oven, the tarry matter roasted until fixed or is insoluble in water. The acetate of calcium thus formed not only requires a great deal of care and expense in the manufacture, but contains about twenty per cent. of foreign acids and tarry matter.

The above-recognized method is not applicable to the treatment of a distillate from pine wood, owing to the excessive amount of tar, tar acids, and turpentine, the acetate of calcium produced being so contaminated with tarry matter as to make it unsalable. In the absence of any process to work up the distillate of pine wood acid-makers have confined their operations practically to hard woods, which are more expensive than the woods carrying rosins.

In our process both neutralizing the acid while in liquid form and evaporating down the neutralized liquid to the crystallizing-point is avoided, as the crystals or salts so produced will contain all the foreign matter which has a volatile point is below that of water. With our process the pyroligneous acid is vaporized and the vapors pass over lime, the lime being kept at a higher temperature than the volatile point of water will not form a hydrate. The acid portion of the vapors will combine with the lime, while the aqueous vapor, together with the light oil and alcohol-vapors, will pass into a condenser and be condensed. The heavy tarry matter and oils which form a part of the pyroligneous acid, which has a volatile point below that of acetic acid, will remain in the evaporating-chambers.

It has been practically demonstrated by our process that when the vapor from crude acids were passed over lime that was maintained at a temperature above the degree at which the vapors were formed, only the acid portions of the vapor combined with lime, which resulted in a product of calcium acetate free from oil or tarry impurities containing from eighty-six per cent. to ninety-five per cent. of acid from the distillate of pine wood, thus eliminating the heavy tarry matter, recovering the acid in the form of an acetate, and separating the light oils and watery products at one operation and in a continuous manner.

The figure represents a side elevation of the apparatus, partly in section.

A A A are wooden tanks for holding a supply of crude acids.

*a a a* are pipes for conveying acid to metal evaporating-chambers B B B, having within metal steam-coils *b* for supplying heat to evaporate the acid.

C C C are glass gages for determining the quantity of acid in the chamber, and c c c are suitable steam-traps for draining off the condensed water in the steam-heating coil.

f f f are valves for letting off tarry residue.

f' f' f' are valves opening into pipe G, which conveys vapor from chambers B B B to base of column H.

h is the hopper for receiving the lime in a finely-divided state.

i is a screw for feeding the lime into the chamber H, driven by worm and worm-gear I.

j is a neck having an annular space for steam for the purpose of heating the lime before it enters the column H as it is conveyed through same by screw i.

J is a metal rotary shaft carrying S-shaped arms K for stirring the lime and passing it from one shelf k to the other, said shaft being driven by worm and worm-gear l.

L is the metal body of column, having an annular space for steam to heat up the column.

m is a worm driven by worm wheel and gear M for removing the lime acetate.

N is a condenser-head, n condenser-pipes, and n' a condenser-body.

O is a pipe for admitting cold water within the body of the condenser, which passes around the condenser-tubes and out the overflow-pipe o.

P is the receiving-tank for the light oils and water resulting from condensation.

p and p' are partitions in tank.

Q is a float attached to a sliding rod, having at its lower end a valve for letting off the condensed water.

R is an opening to a swivel-pipe r for drawing off light oils.

S is a steam-pipe for conveying live steam to evaporating-chambers, and s is a valve for admitting steam to the annular space in column H.

T is a trap for drawing off water due to condensation.

To carry out the process, tanks A A A are filled with pyroligneous acid, and evaporating-chambers B B B are filled about two-thirds full by opening valves on pipes a a a. Steam is then admitted into the annular space of column H and neck J through valve s. Lime is then introduced into hopper h, and worm-gears I l are started. Lime is fed into column H and is carried by the S-shaped arms K from one shelf to the next below, the lime passing through an opening in the center of the top shelf to the shelf below, where it is by the S-shaped arms K K passed through to the opening near the outer edge of the second shelf, and so on, each alternating shelf having an opening near the center and the corresponding shelf an opening near the outer edge. When the lime has reached the lower shelf, the driving mechanism I l is stopped and steam is admitted into coils b at about one hundred pounds' pressure. When the acid is sufficiently heated for the vapors to pass into column H through pipe G, then the driving-gears I l M are started and valve M' is opened. The temperature in the column H should be constantly kept above the volatile point of water, so the vapors will not condense on the lime, but pass over into the condenser, while the acid portions of the vapors are by chemical affinity taken up by the lime. The column H is proportioned in relation to the evaporating-chambers B, so as to give sufficient surface of lime on the shelves to completely take up the acid portion of vapor before the vapor has reached the top shelf. The vapors that pass from the top of the column H into the condenser-head M being composed of light oils, alcohol, and water, are condensed by passing through condenser-pipes n, which are surrounded by cold water. The products condensed collect in tank P, pass under partition p, and over partition p', where the water is drawn off at the valve q by the float Q, raising on the surface of the oil, while the oil is drawn off through swivel-pipe R.

In order that the acid-vapors passing into column H may be of uniform strength, so that the speed of gears I, l, and M may be fixed, it is preferable to use either two or four evaporating-chambers and allow one to be filling while the other is emptying. The apparatus shown is preferably employed for making calcium acetate, but may be modified without varying or affecting the object of the invention. For illustration: The evaporating-chambers B may be dispensed with entirely and the gaseous product carried into column H directly from the carbonizers of any ordinary construction after passing through any receptacle that will reduce the temperature to about 215° Fahrenheit, which is sufficient to condense the heavy tarry products, or the column H may be of any mechanical construction that will permit the lime or similar agent in which the acid is to act upon being kept at a temperature above the volatile point of water.

While we have in the foregoing description of our process defined the same in its relation to the formation of acetate of lime, we do not wish to be understood as limiting the invention to such production, but contemplate its application to the formation of the several metallic acetates from various sources of crude acid.

We are aware that it has heretofore been proposed to manufacture the acetate of lime by passing the superheated vapors through lime or its equivalent, the lime being cold, a process of this kind being described in Patent No. 118,787, granted September 12, 1871, to Burcey. By this method a portion of the water, tar, and light oils is condensed by the cold lime reducing the temperature, and a drying-pan is provided to again evaporate the lime salts to dryness. This process produces entirely different results from those produced by our process, where the vapors of pyroligneous acid are passed over any suitable base that is heated and maintained at a temperature above that at which the said vapors are generated. As the light oils and water pass over the base material and are not partially condensed, the drying pan or process is dispensed with and the product contains a larger percentage of acid and less foreign matter.

By our process pyroligneous acid formed from pine wood that carries a large percentage of turpentine may be treated, and the turpentines that distil over with the water, naphtha, and acid are recovered without condensation upon the lime or other base metal being acted upon by the acid.

It is well known that when acid-vapors containing oils, naphthas, or turpentine are superheated, as by the Burcey process, they darken from decomposition and then when passed over lime that has not been independently heated to a point above the temperature of the vapors a considerable portion of the carbonaceous matter is condensed on the lime, which results in the formation of a very low grade of acetate, which requires to be dried and the tarry matter fixed before treatment for acetic acid, and we have found that when the pyroligneous acid is derived from rosin and turpentine bearing woods the excess of tar carried into and condensed on the lime is so great as to make the product unsalable unless the lime is kept at or above the temperature at which the vapors were formed, so that such empyreumatic vapors, which are constituents of the crude acid manufactured from pine wood, are prevented from condensing upon the base substance being acted upon by the acid-vapors, as any tarry matter or oils condensed upon the lime, even when evaporated to dryness, which necessitates a separate treatment, will form a part of the salt.

By our process we are enabled to use a pyroligneous acid formed from pine wood that has been practically a waste and to produce therefrom a commercial acetate of great purity, and at the same time and in a continuous manner recover the turpentines and naphtha.

While we have described the heating of the column H by steam, it is evident that other sources of heat may be substituted therefor if preferred.

Having thus described the invention, what is claimed as new is—

1. The formation of a metallic acetate by bringing into contact acetic-acid vapors with a suitable lime base, while said substance is in a heated state, the temperature being maintained at or above the boiling-point of water by a source of heat independent from the latent heat of the acid-vapors, substantially as described.

2. The process of forming a metallic acetate, which consists in heating lime to a temperature above the boiling-point of water and subjecting it to the action of pyroligneous-acid vapors while in a heated state, and combining the acid constituent and lime, substantially as described.

3. The process of forming a metallic acetate free from tarry matter, which consists in maintaining the lime base, being subjected to the action of the acid-vapors, at a temperature sufficiently high to prevent the tarry matter, watery vapors or other foreign substances from being condensed upon the material treated by an independent source of heat, substantially as described.

4. The process of forming a metallic acetate, which consists in keeping the base in a dry, heated state, subjecting it to a sufficiently high temperature to enable it to resist the condensation of foreign matter and aqueous vapors brought into contact therewith, thus obviating the necessity of roasting the product to evaporate or fix the foreign substances, substantially as described.

5. In the process of forming metallic acetates, the bringing of metallic acid-vapors into contact with a finely-divided lime base and agitating said metallic base while the same is in a heated state and in contact with the acid-vapors, and condensing separately the aqueous vapors carrying foreign matter, substantially as described.

6. The process of heating calcium or other metallic substance to a temperature above the boiling-point of water by a source of heat independent of the direct application of latent heat contained in the crude acid-vapor being treated, and subjecting said metallic substance to the action of acetic-acid vapors while in such a heated state, to form the salts of the metal, substantially as described.

7. The herein-described process of making an acetate of a lime base, which consists in bringing the vapors of crude acetic acids in contact therewith and keeping the said base at or above the temperature of said vapors, substantially as described.

8. The herein-described process of forming a metallic acetate, which consists in subjecting a metallic base to the action of acetic-acid vapors and maintaining said base at a temperature sufficiently high to prevent the aqueous vapors or the vapors of other foreign matter which have a volatile point below 100° centigrade, from becoming condensed upon said base, substantially as described.

9. The herein-described process of making an acetate of a metallic base, which consists in first separately heating the metallic base to at least 100° centigrade, whereby hydration thereof is prevented, then bringing the vapors of acetic acid in contact with said hot base and maintaining the temperature of said base by a heat-supply independent of the heat of the acid-vapor itself, as set forth.

In testimony whereof we affix our signatures in presence of two witnesses.

VICTOR LEE EMERSON.
WILLIAM R. EMERSON.

Witnesses:
THOS. C. BAILEY,
CHARLES LEVIS.